US008388438B2

(12) United States Patent
Englman et al.

(10) Patent No.: US 8,388,438 B2
(45) Date of Patent: Mar. 5, 2013

(54) WAGERING GAME PROVIDING SUGGESTION FOR GAME FEATURE TO BE ACHIEVED IN SUBSEQUENT PLAY

(75) Inventors: Allon G. Englman, Chicago, IL (US); Daniel P. Louie, Chicago, IL (US); Michael W. Mastropietro, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/063,220

(22) PCT Filed: Nov. 11, 2009

(86) PCT No.: PCT/US2009/063986
§ 371 (c)(1),
(2), (4) Date: Mar. 10, 2011

(87) PCT Pub. No.: WO2010/056715
PCT Pub. Date: May 20, 2010

(65) Prior Publication Data
US 2011/0183746 A1 Jul. 28, 2011

Related U.S. Application Data

(60) Provisional application No. 61/113,889, filed on Nov. 12, 2008.

(51) Int. Cl.
*A63F 9/24* (2006.01)
*A63F 13/00* (2006.01)
*G06F 17/00* (2006.01)
*G06F 19/00* (2011.01)

(52) U.S. Cl. ............... 463/25; 463/16; 463/20; 463/19; 463/27

(58) Field of Classification Search .................. None
See application file for complete search history.

(56) References Cited

U.S. PATENT DOCUMENTS

| 5,449,173 | A  | 9/1995  | Thomas et al. | 273/143   |
|-----------|----|---------|---------------|-----------|
| 6,190,254 | B1 | 2/2001  | Bennett       | 463/13    |
| 6,251,013 | B1 | 6/2001  | Bennett       | 463/13    |
| 6,311,976 | B1 | 11/2001 | Yoseloff et al. | 273/138.2 |
| 6,375,570 | B1 | 4/2002  | Poole         | 463/31    |
| 6,390,473 | B1 | 5/2002  | Vancura et al. |          |
| 6,419,579 | B1 | 7/2002  | Bennett       | 463/20    |

(Continued)

OTHER PUBLICATIONS

International Search Report for PCT/US2006/35194 mailed Apr. 9, 2007 (2 pages).

(Continued)

*Primary Examiner* — Paul A D'Agostino
(74) *Attorney, Agent, or Firm* — Nixon Peabody LLP

(57) ABSTRACT

A gaming system for conducting a wagering game includes a game display configured to display an array of symbols indicating a randomly selected outcome of the wagering game in response to receiving a wager from a player, an input device adapted to receive inputs from a player and to output a signal to a controller corresponding to the player inputs and a controller configured to conduct a wagering game and a game feature associated with the wagering game. The controller is further configured to enable play of the wagering game responsive to an input of a first wager and to enable the game feature responsive to an input of a second wager further to the first wager. The game feature provides an opportunity for the player to receive, further to a winning outcome in the wagering game, a first positive feature in the game feature, and provides an opportunity for the player to receive, further to a losing outcome in the wagering game, a second positive feature in the game feature.

28 Claims, 8 Drawing Sheets

U.S. PATENT DOCUMENTS

| | | | |
|---|---|---|---|
| 6,435,511 B1 | 8/2002 | Vancura et al. | |
| 6,439,993 B1 | 8/2002 | O'Halloran | 463/16 |
| 6,494,454 B2 | 12/2002 | Adams | 273/292 |
| 6,517,432 B1 | 2/2003 | Jaffe | 463/16 |
| 6,554,283 B2 | 4/2003 | Vancura et al. | |
| 6,561,900 B1 | 5/2003 | Baerlocher | 463/20 |
| 6,604,740 B1 | 8/2003 | Singer et al. | 273/292 |
| 6,616,142 B2 | 9/2003 | Adams | 273/292 |
| 6,634,941 B2 | 10/2003 | Olive | 463/16 |
| 6,692,005 B2 | 2/2004 | Vancura et al. | |
| 6,761,632 B2 | 7/2004 | Bansemer et al. | |
| 6,780,109 B2 | 8/2004 | Kaminkow | 463/20 |
| 6,805,349 B2 | 10/2004 | Baerlochur et al. | 273/138.2 |
| 6,805,632 B2 | 10/2004 | Suda | 463/25 |
| 6,866,583 B2 | 3/2005 | Glavich et al. | 463/20 |
| 6,905,406 B2 | 6/2005 | Kaminkow et al. | 463/20 |
| 6,921,335 B2 | 7/2005 | Rodgers et al. | 463/30 |
| 6,997,808 B2 | 2/2006 | Rodgers et al. | 463/30 |
| 7,001,273 B2 | 2/2006 | Baerlocher | |
| 7,014,559 B1 | 3/2006 | Fong | 463/20 |
| 7,048,275 B2 | 5/2006 | Adams | 273/292 |
| 7,056,213 B2 | 6/2006 | Ching et al. | 463/20 |
| 7,070,502 B1 | 7/2006 | Bussick et al. | 463/20 |
| 7,074,127 B2 | 7/2006 | Cuddy et al. | 463/20 |
| 7,090,580 B2 | 8/2006 | Rodgers et al. | 463/20 |
| 7,137,888 B2 | 11/2006 | Glavich et al. | 463/20 |
| 7,195,559 B2 | 3/2007 | Gilmore et al. | 463/20 |
| 7,226,359 B2 | 6/2007 | Bussick et al. | 463/20 |
| 7,237,775 B2 | 7/2007 | Thomas et al. | 273/143 |
| 7,252,592 B2 | 8/2007 | Rodger et al. | 463/30 |
| 7,360,764 B2 | 4/2008 | Vancura et al. | |
| 8,177,621 B2 | 5/2012 | Jaffe et al. | |
| 2002/0107066 A1* | 8/2002 | Seelig et al. | 463/20 |
| 2002/0155879 A1* | 10/2002 | Walker et al. | 463/20 |
| 2003/0087693 A1* | 5/2003 | Baerlocher et al. | 463/25 |
| 2003/0092477 A1* | 5/2003 | Luciano et al. | 463/16 |
| 2003/0148807 A1* | 8/2003 | Acres | 463/26 |
| 2004/0009806 A1* | 1/2004 | Odom | 463/19 |
| 2004/0048644 A1 | 3/2004 | Gerrard et al. | |
| 2004/0053680 A1* | 3/2004 | Schultz | 463/20 |
| 2004/0072613 A1* | 4/2004 | Visocnik | 463/25 |
| 2004/0106449 A1* | 6/2004 | Walker et al. | 463/25 |
| 2004/0142740 A1* | 7/2004 | Damico et al. | 463/20 |
| 2005/0037829 A1* | 2/2005 | Baerlocher et al. | 463/16 |
| 2005/0054423 A1 | 3/2005 | Wadleigh | 463/20 |
| 2005/0130731 A1 | 6/2005 | Englman et al. | 463/20 |
| 2005/0148384 A1 | 7/2005 | Marks et al. | 463/20 |
| 2005/0159208 A1 | 7/2005 | Pacey | 463/20 |
| 2006/0063580 A1* | 3/2006 | Nguyen et al. | 463/16 |
| 2006/0073886 A1* | 4/2006 | Tempest et al. | 463/27 |
| 2006/0128461 A1 | 6/2006 | Okada | |
| 2007/0060262 A1 | 3/2007 | Kosaka et al. | |
| 2008/0113735 A1 | 5/2008 | Maya | 463/20 |
| 2008/0188286 A1 | 8/2008 | Jaffe | 463/20 |
| 2009/0111565 A1 | 4/2009 | Suda | |
| 2009/0258690 A1* | 10/2009 | Tarantino | 463/13 |
| 2009/0286588 A1* | 11/2009 | Jackson | 463/20 |
| 2010/0035676 A1* | 2/2010 | Nicely et al. | 463/16 |

OTHER PUBLICATIONS

International Search Report for PCT/US2009/063986 mailed Jan. 6, 2010 (2 pages).

Written Opinion for PCT/US2009/063986 mailed Jan. 6, 2010 (7 pages).

Letter for PCT Article 34 Amendments and Response to Written Opinion, for PCT/US2009/063986; Feb. 3, 2010 (15 pages).

* cited by examiner

WAGERING GAME PROVIDING SUGGESTION FOR GAME FEATURE TO BE ACHIEVED IN SUBSEQUENT PLAY

CLAIM OF PRIORITY AND CROSS-REFERENCE TO RELATED APPLICATIONS

This application is a U.S. National Phase of International Application No. PCT/US2009/063986, filed on Nov. 11, 2009, which claims the benefit of and priority to U.S. Provisional Patent Application No. 61/113,889, filed on Nov. 12, 2008, both of which are incorporated herein by reference in their respective entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, gaming machine systems, and methods for playing wagering games.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Another way to increase the entertainment value of a game is to enhance the display of the gaming machines. For gaming machines with video displays, improvements in video technology have enabled the display of richer and more colorful graphics. For gaming machines with mechanical displays, however, the enhancements early on were less technologically advanced. For example, some mechanical reel symbols were colored by backlighting the mechanical symbols with colored lighting elements. Sometimes the reel itself might contain electroluminescent elements that defined one or more reel symbols. To display a symbol in multiple colors or formats using such an arrangement, multiple electroluminescent elements were needed for the symbol.

Recent advances in transmissive display technology have made it possible to more easily modify the appearance of mechanical displays. A transmissive display is essentially a transparent video display that is superimposed over the mechanical display. The transmissive display may then be operated to display selected video images over the mechanical display. These video images may include translucent portions such that the underlying mechanical display is visible, but in an altered state (i.e., different color, texture, etc.). The video images may also include opaque portions so as to completely block out parts of the underlying mechanical display.

The above-described transmissive display technology gives wagering game designers the capability and flexibility to more easily design and modify the appearance of mechanical displays. Accordingly, there is a need to develop new and improved wagering games for mechanical displays using this technology, with features that take full advantage of the capabilities of the transmissive display to thereby enhance the entertainment value of the wagering games.

SUMMARY OF THE INVENTION

According to one aspect of the present invention, a gaming system for conducting a wagering game includes a game display configured to display an array of symbols indicating a randomly selected outcome of the wagering game in response to receiving a wager from a player, an input device adapted to receive inputs from a player and to output a signal to a controller corresponding to the player inputs and a controller configured to conduct a wagering game and a game feature associated with the wagering game, the controller further being configured to enable play of the wagering game responsive to an input of a first wager and to enable the game feature responsive to an input of a second wager further to the first wager. The game feature provides an opportunity for the player to receive, further to a losing outcome in the wagering game, a positive feature in a subsequent wagering game.

According to another aspect of the invention, a method of conducting a wagering game on a gaming system comprises the acts of accepting a first wager to play a first wagering game, accepting an extra wager, further to the first wager, to enable a game feature relating to the first wagering game, and enabling the game feature responsive to an input of the extra wager, the game feature providing an opportunity for the player to receive, responsive to a losing outcome in the first wagering game, a randomly selected positive feature in a subsequent play of the wagering game. The method also includes displaying the randomly determined outcome of the first wagering game, the randomly determined outcome comprising a losing outcome, accepting a second wager to play a second wagering game subsequent to the first wagering game, displaying the randomly determined outcome of the second wagering game, the randomly determined outcome comprising the positive feature displayed in the first wagering game, and awarding any award associated with any winning outcome in the second wagering game.

According to yet another aspect of the invention, a computer readable storage medium is encoded with instructions for directing a gaming system to perform the above method.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
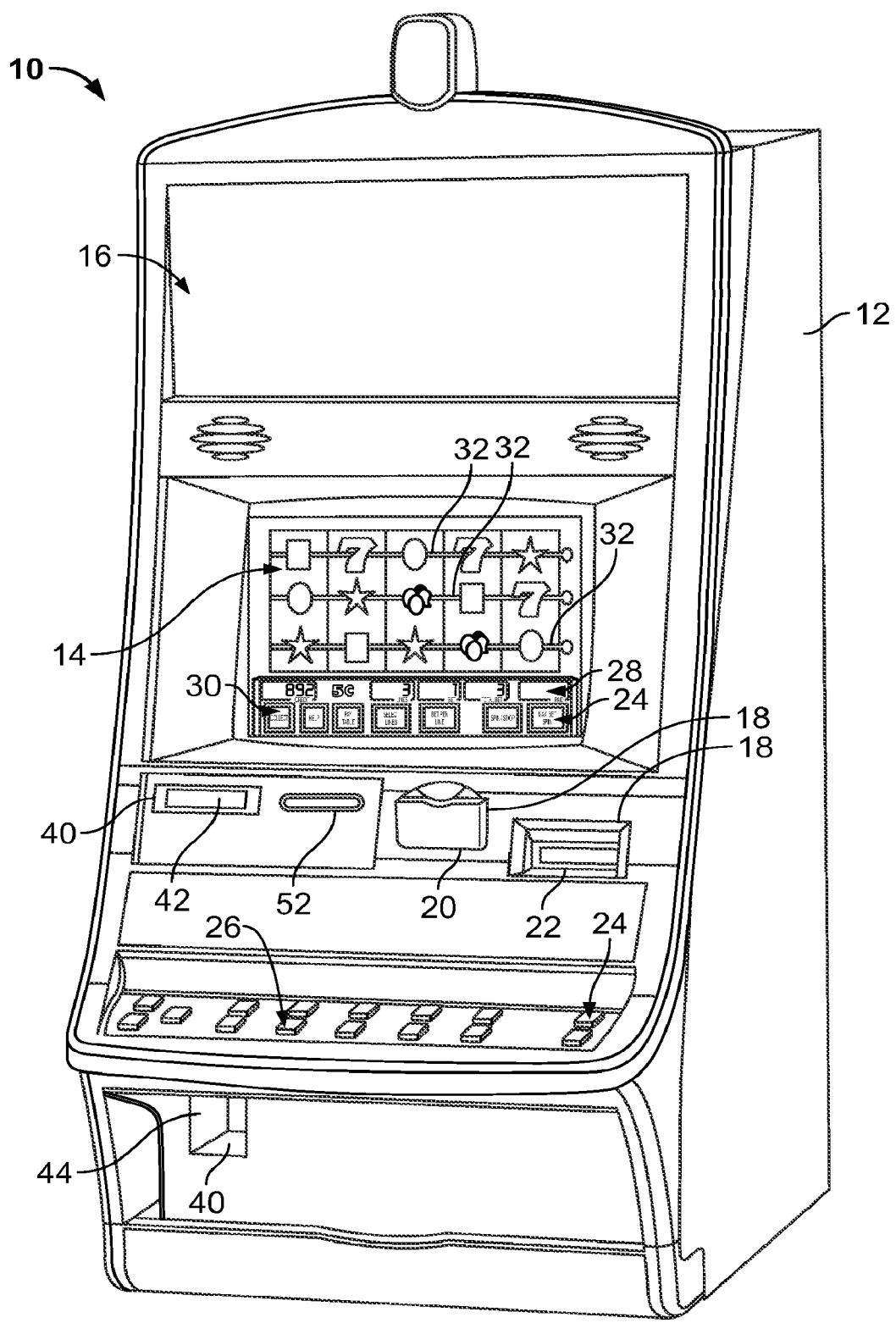
FIG. 1a is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1a, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1a). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device, such as an electronic purse or wallet. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1a, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
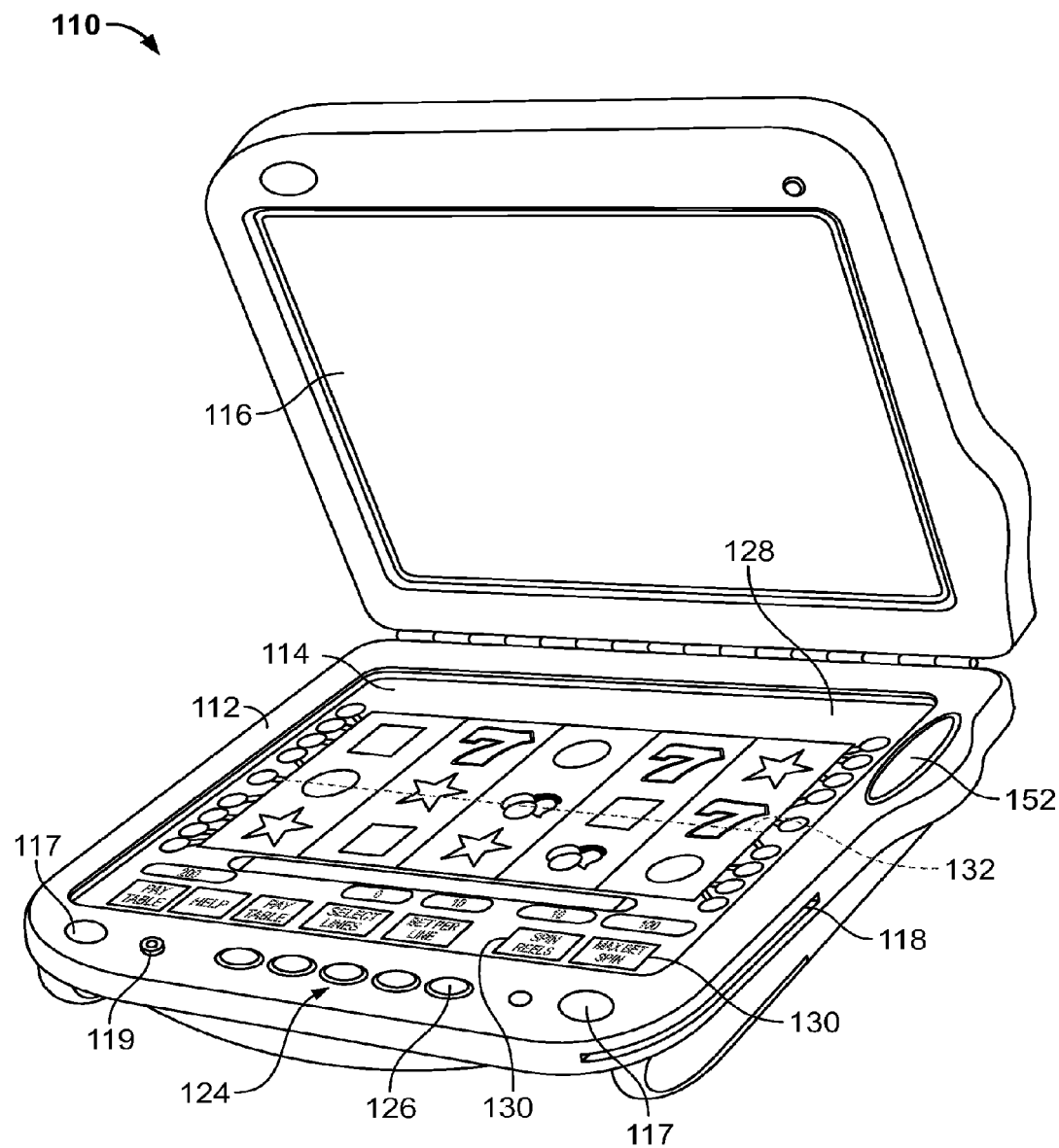
FIG. 1b is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game.

The various components of the handheld gaming machine 110 may be connected directly to, or contained within, the casing 112, as seen in FIG. 1b, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1b, comprises a biometric sensing device.

Figure 2:
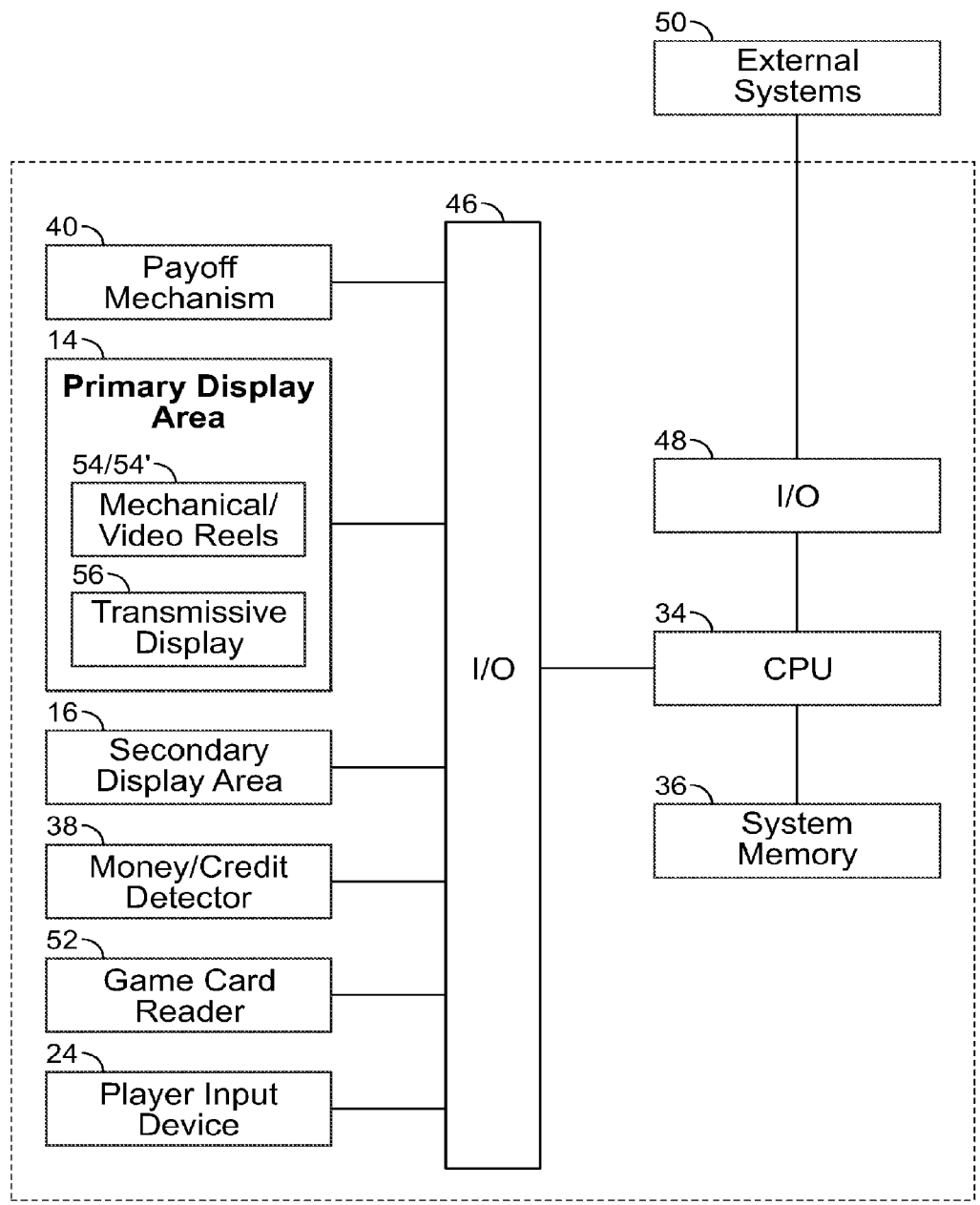
FIG. 2 is a block diagram of a control system suitable for operating the gaming machines of FIGS. 1a and 1b.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1a, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Security features are advantageously utilized where the gaming machines 10,110 communicate wirelessly with external systems 50, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, ESTABLISHING WIRELESS ROBUST SECURITY NETWORKS: A GUIDE TO IEEE 802.11, and SP 800-48, WIRELESS NETWORK SECURITY: 802.11, BLUETOOTH AND HANDHELD DEVICES, both of which are incorporated herein by reference in their entirety.

Figure 3:
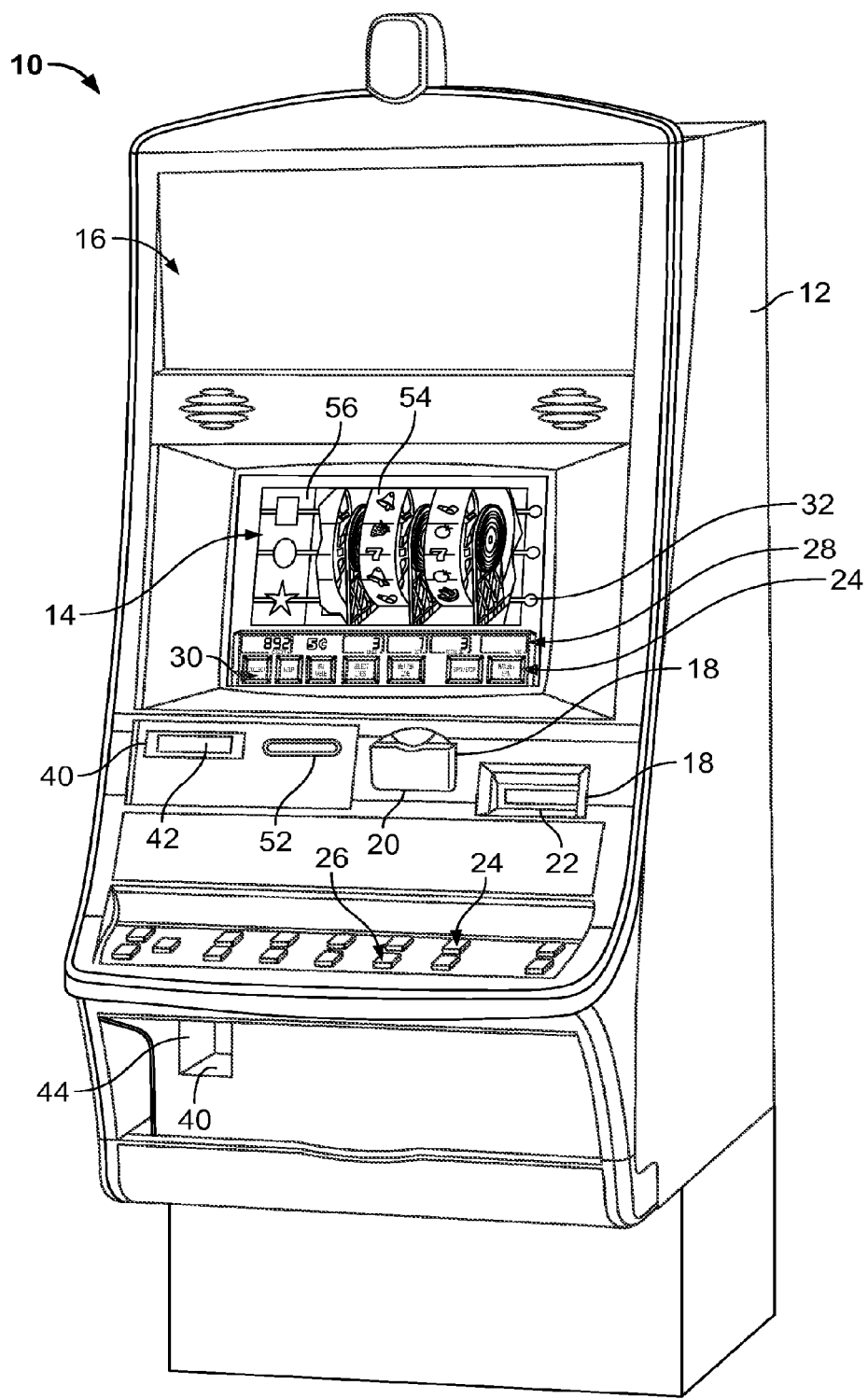
FIG. 3 is a perspective view of a free standing gaming machine embodying aspects of at least one embodiment of the present invention.

Referring to FIG. 3, another example of a mechanical reel gaming machine 10 in accord with at least some aspects of the present concepts comprises a housing 12, input devices (e.g., value input device 18, player input device 24, push buttons 26, touch screen 28, soft touch keys 30, etc.), primary display area 14, secondary display area 16, player information reader 52, and the like, similar to that shown in FIG. 1a and described above. In FIG. 3, however, the primary display area 14 comprises a plurality of mechanical reels 54 and a transmissive display 56 superimposed over the mechanical reels 54. The transmisisve display may optionally comprise a touch screen display. While the exemplary embodiments described below refer to the mechanical reels 54, in other embodiments the mechanical reels 54 can be replaced with video reels 54' such that the primary display area 14 can include the transmissive display 56 being superimposed over a plurality of video reels 54, such as may be provided in the gaming machines 10 of FIGS. 1a and 3 (in lieu of the mechanical reels) or in the handheld gaming machine 110 of FIG. 1b.

Figure 4A:
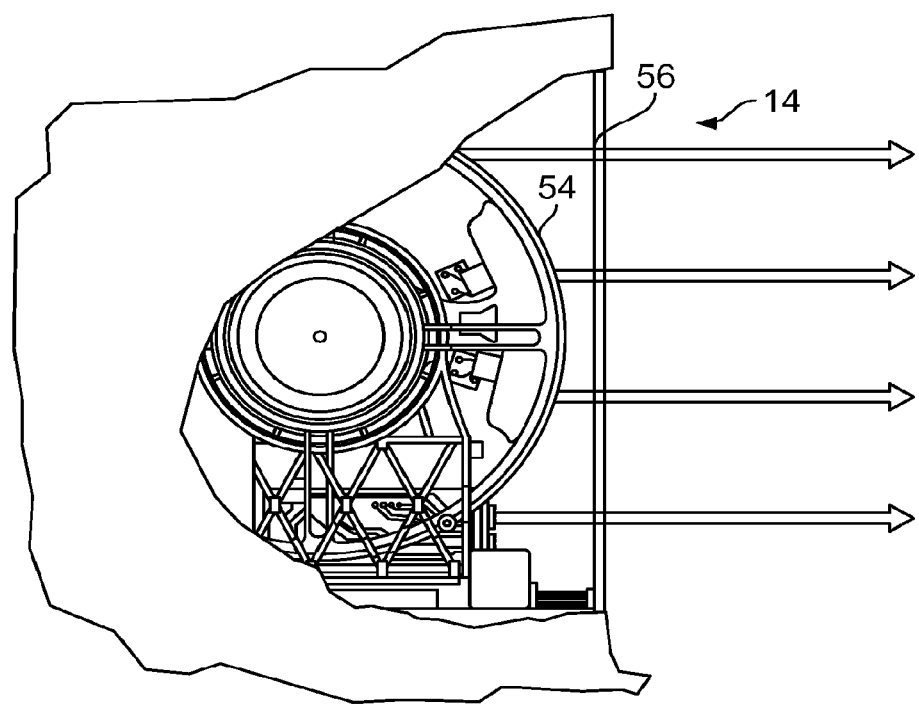
FIGS. 4a-4b are cross-sectional side views of a display area embodying the aspects of at least one embodiment of the present invention.
Figure 4B:
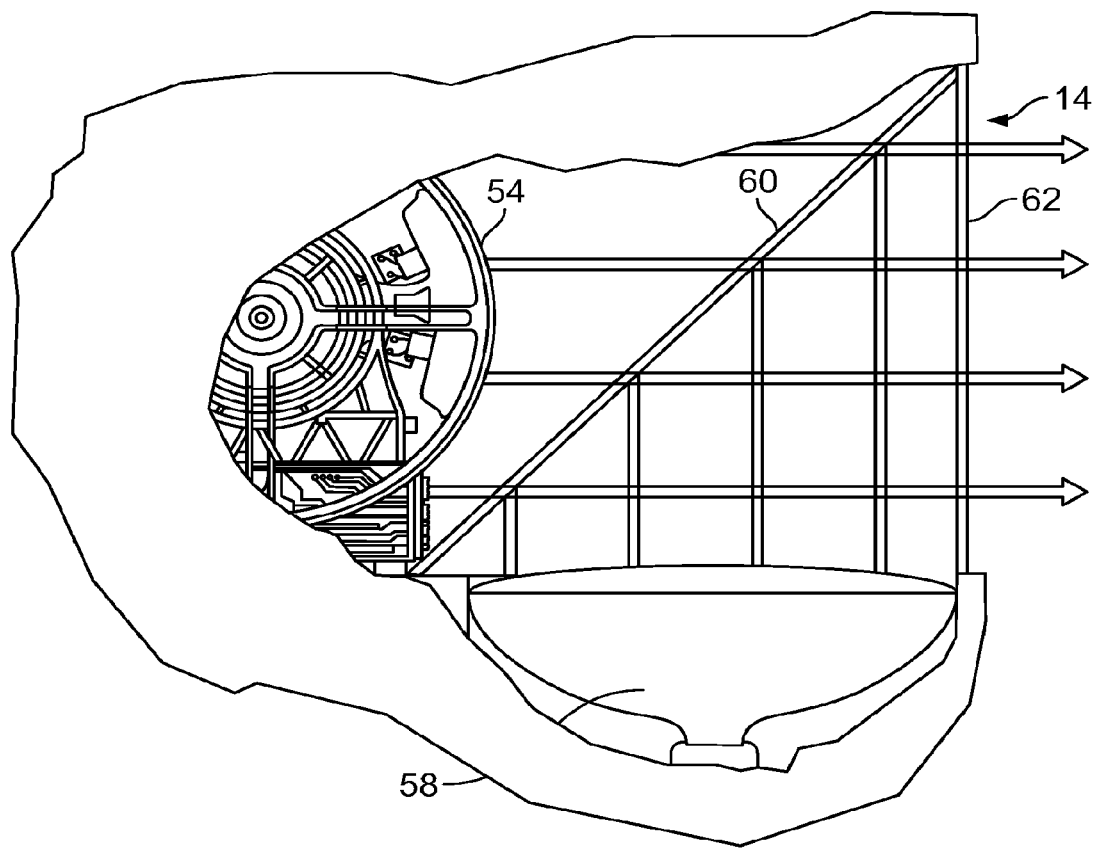

FIGS. 4a-4b illustrate exemplary implementations of the primary display area 14 of the gaming machine 10 depicted in FIG. 3 in which a video image is superimposed over the mechanical reels 54. Although not expressly labeled, each reel of the mechanical reels 54 has a plurality of reel symbols to represent a randomly-selected outcome of the wagering game. The video image may then be positioned over the mechanical reels 54 to enhance and/or alter the appearance (e.g., color, texture, etc.) of the mechanical reels 54. There are at least two possible configurations for the primary display area 14: a direct image configuration (FIG. 4a), and a virtual image configuration (FIG. 4b). Referring first to the direct image configuration of FIG. 4a, a transmissive display 56 is positioned directly in front of the mechanical reels 54 and generates a direct image. In such an arrangement, the transmissive display 56 may be a flat panel transmissive video display, for example, a transmissive liquid crystal display (LCD) commercially available from LG Phillips LCD Co., Ltd., of Seoul, Korea, Sharp Electronics Corp. of Tokyo, Japan, or any other display manufacturer. The flat panel transmissive video display is preferably preconfigured with the touch screen 28 (see FIG. 3) mounted to a front surface of the display. In the virtual image configuration of FIG. 4b, a reflected video image is used instead of a direct image. In such an arrangement, the reflected video image may be generated by, for example, a standard video display 58 and a partially reflective minor 60. The standard video display 58 may be mounted below the mechanical reels 54 and substantially normal thereto, and the partially reflective mirror 60 may be positioned over the mechanical reels 54 at a predetermined angle (e.g., 45 degrees). Video images from the standard video display 58 are then reflected off the partially reflective minor 60 so that they appear to a player to be superimposed over the mechanical reels 54. The video projection display 58 may be any suitable video projection display known to those having ordinary skill in the art, including a CRT projector, LCD projector, plasma, LED projector, DLP projector, LCOS projector, D-ILA projector, electro luminescent, and the like. In some embodiments, the primary display area 14 further comprises a transparent glass cover/window 62 positioned over the partially reflective minor 60 to protect the mirror 60. Such a cover/window 62 may be optionally configured with the touch screen 28 for receiving player input.

The superimposed video images may be selectively made transparent, semi-transparent (i.e., translucent), or opaque in selected places. This allows preselected images to be displayed over certain portions of the primary display area 14, with the result that certain areas of the primary display area 14 are either altered in some way (e.g., highlighted, colored, etc.), or completely blocked by the superimposed images. All video images superimposed on the primary display area 14 may be rendered in two-dimensional (e.g., using Flash Macromedia™) or three-dimensional graphics (e.g., using Renderware™) The images may be played back (e.g., from a recording stored on the gaming machine 10), streamed (e.g., from the gaming network), or received as a TV signal (e.g., either broadcast or via cable). The images may be animated, or they may be real-life images, either prerecorded (e.g., in the case of marketing/promotional material) or as live footage, and the format of the video images may be an analog format, a standard digital format, or a high-definition (HD) digital format. Using superimposed video images in this way allows numerous types of improvements and enhancements to be made to the appearance of the primary display area 14 in real time and during on-going game play.

For information regarding the use of video overlay technology in gaming machines and for embodiments employing video overlay displays, the reader is referred to commonly assigned U.S. Published Application No. 20040198485, titled "Gaming Machine with Superimposed Display Image," filed on Nov. 7, 2003, and also to commonly-assigned U.S. Pat. No. 6,517,433, titled "Reel Spinning slot Machine With Superimposed Video Image," issued on Feb. 11, 2003, each of which is incorporated herein by reference in its entirety.

As with the gaming machine 10 of FIG. 1*a*, the gaming machine 10 of FIG. 3 comprises or is connected to controller 34 (see, e.g., FIG. 2) that controls the primary display area 14, the player input device 24, payoff mechanism 40, and other components and systems of the gaming machine or even of plural gaming machines. The primary display area 14 in the embodiment represented in FIG. 3 uses a transmissive display 56 to superimpose a video image over the mechanical/video reels 54/54'. As noted above, a reflected image arrangement, such as is shown in FIG. 4*b*, may alternatively or also be used in other embodiments.

Thus far, embodiments of the invention have only been described as video images being superimposed on the primary display area 14. It is also possible, however, to superimpose the video images on the secondary display area 16 as well without departing from the scope of the invention. Still, in most embodiments, the primary display area 14 is the one with the video images superimposed thereon. The reason for this is because in most gaming machines 10, the primary display area 14 is the one that includes the mechanical reels (e.g., for a slot machine), a mechanical wheel (e.g., a roulette game), one or more dice, a pachinko board, or other board game. In alternative embodiments, however, the primary display area 14 may include video reels 54' by using a video display such as a CRT or LCD. Video images may then be superimposed on the video reels 54' as needed. In further alternative embodiments, the primary display area 14 may include a diorama presenting a three-dimensional model of a game environment. The diorama may be stationary in some implementations, or it may slide or move around in one or more dimensions.

Figure 5:
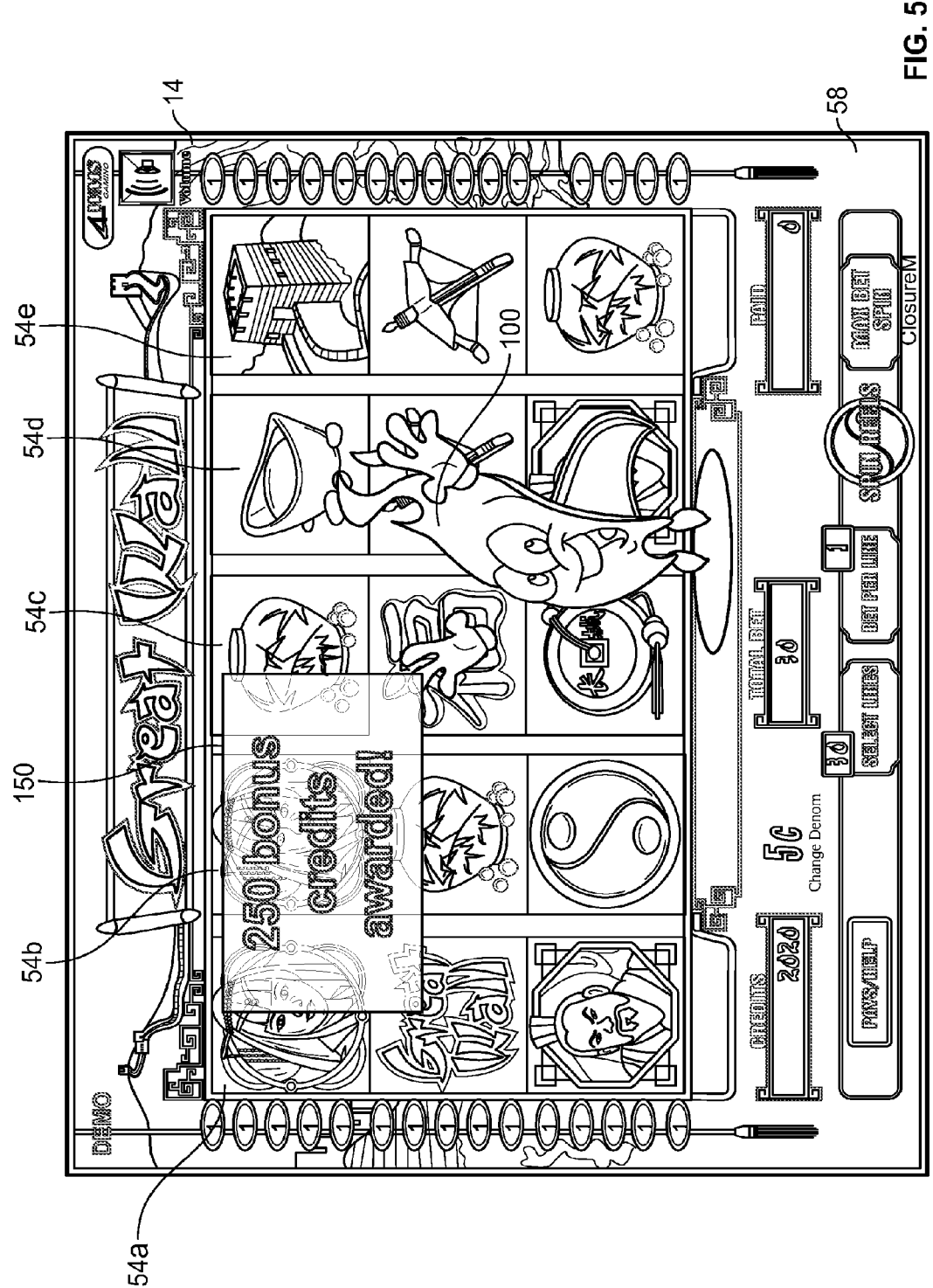
FIG. 5 is a representative screen shot illustrating at least some aspects of the present concepts.
Figure 6:
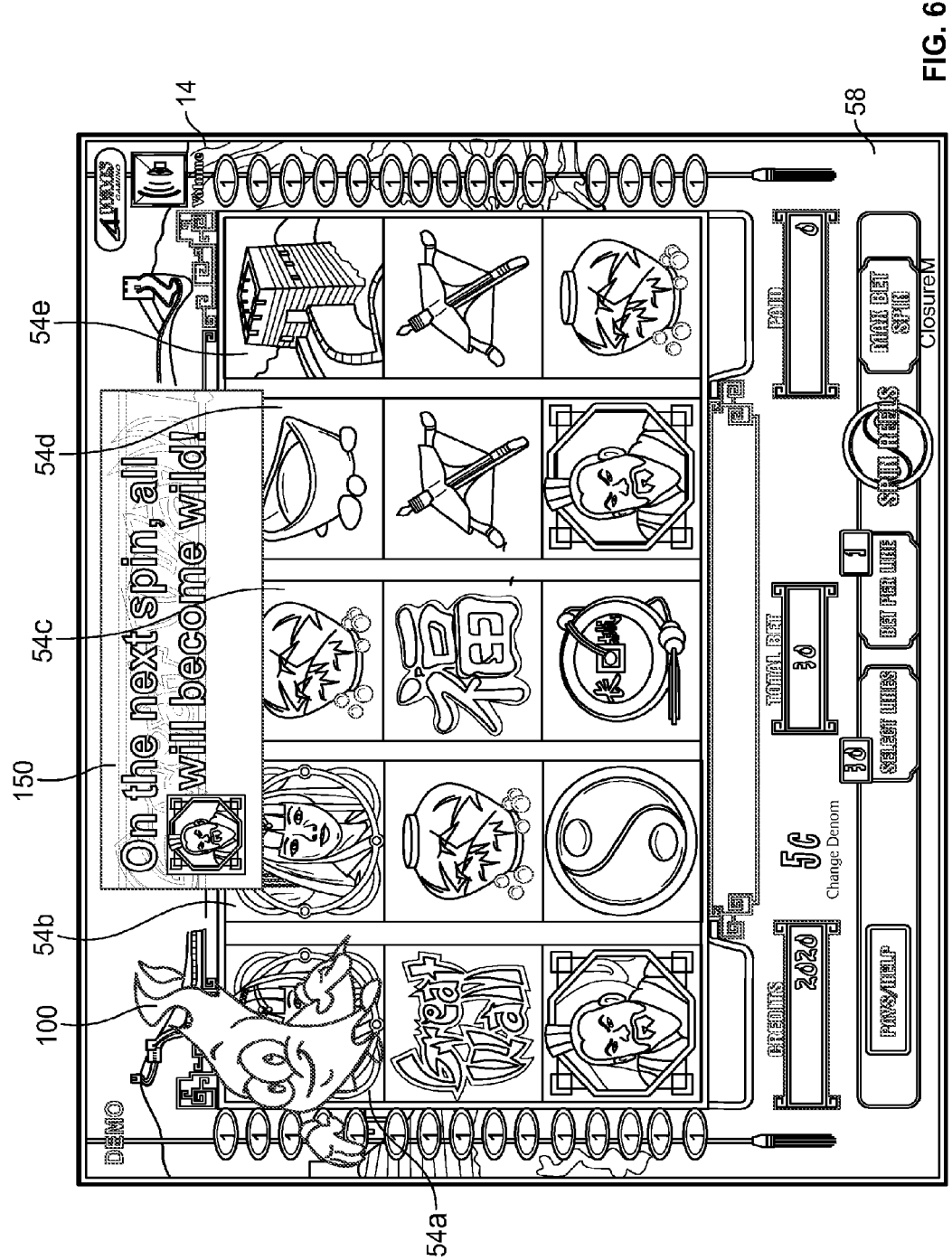
FIG. 6 is a representative screen shot illustrating another aspect of the present concepts.

In accord with aspects of the present concepts, represented in part in FIGS. 5-6, there is provided an apparatus, system, and method comprising a game feature, described herein, that provides opportunity not only to enhance winning outcomes in the wagering game, to supplement losing outcomes in the wagering game, and to create new winning outcomes in the wagering game, but also provides, in certain situations, the opportunity to confer other benefits to a player including providing to a player strategic information about game play in one or more subsequent wagering games.

The game feature is enabled, in some aspects, by placing a max line bet, max bet, or other maximum permissible base wager permitted by the gaming machine and, further to such wager, placing an extra wager in addition to such base wager. The enablement of the game feature may optionally comprise a two-step verification wherein the player is prompted to positively and separately allocate the base wager and the extra wager. Once the game feature is enabled by the extra wager, the wagering game is conducted and the display (e.g., 14, 114) displays to the player a plurality of randomly selected symbols populating a corresponding plurality of symbol positions, the displayed symbols conveying to the player the outcome(s) of the wagering game. The outcome of the wagering game comprise a winning outcome wherein a symbol or symbols along an active pay line corresponds to a defined winning outcome, such as a pay table outcome. Correspondingly, the outcome of the wagering game is a losing outcome when no symbol or symbols along an active pay line corresponds to a defined winning outcome.

The enabled game feature provides an opportunity for the player to receive, further to any winning outcome(s) in the wagering game, a first positive feature. Illustrative, but non-limiting, examples for the first positive feature may include a symbol modifier (e.g., "a wild" modifying one or more symbols, a substitution of one symbol for another symbol, etc.), a bonus trigger modifier (e.g., a bonus is triggered with two bonus symbols instead of three bonus symbols, etc.), an award arrangement modifier (e.g., evaluating a symbol array against a randomly selected "scatter" symbol), a direct award (e.g., a credit award unrelated to any winning combination of symbols), an eligibility for a community game feature or other type of game feature or award, a comp, and/or award modifier (e.g., a multiplier is applied to the entire winning outcome in the wagering game or to a specific portion of an overall winning outcome, such as to a winning outcome on a specific active payline, etc.). The positive feature may be realized immediately, concurrent with the wagering game in which the enabled game feature yields the first positive feature. Alternatively, the positive feature may be conditional and may be deferred to a subsequent play of the wagering game satisfying one or more preconditions. For example, a player achieving the first positive feature does not realize the first positive feature concurrent with the winning outcome yielding the first positive outcome, but is instead notified that he or she is made eligible for the award modifier, and will win the award modifier upon the player's next max bet wager that results in a winning outcome.

The enabled game feature also or alternatively provides an opportunity for the player to receive, further to a losing outcome in the wagering game, a second positive feature. The second positive feature may include, for example, a symbol modifier, a bonus trigger modifier, an award arrangement modifier, a direct award, or a clue relating to a subsequent wagering game. Thus, even though the player has a losing outcome in the wagering game, there is some enhancement to or alteration of the game play in one or more subsequent round(s) of game play to place the player enabling the game feature in a better position, statistically, than he or she would have been in had he or she lost the wagering game without enabling the game feature. For example, a player enables the game feature and the outcome of the wagering game is a losing outcome, the player might receive as the second positive feature a clue informing the player that the next spin "will include three wilds." The player would then be motivated to not only input a wager in a subsequent play of the wagering game, but would also be motivated to maximize his or her wager and max bet his or her next play of the wagering game.

On the next play, the three wilds would appear and may, or may not, benefit the player. In other words, the wilds may appear in a position that is not advantageous to the player. If a player plays a max bet in the round including three wilds and utilizes all available pay lines associated therewith, the player's changes of capitalizing on the three wilds would be maximized.

The set of possible awards for the first positive feature and the second positive feature may be different, such as shown in the example above, or they may be the same. In the preceding example, the first group uniquely includes an award modifier and the second group uniquely includes the clue award. Although the first positive feature and the second positive feature may be selected from the same group of potential outcomes, it is presently preferred to provide some differentiation of positive features associated with winning outcomes in the wagering game and losing outcomes in the wagering game. Accordingly, in such aspects, the first positive feature is selected from a first group of positive features and the second positive feature is selected from a second group of positive features.

The above-noted opportunity for a positive feature, whether the first positive feature or second positive feature, is in most instances purely an opportunity for such outcome based on a random determination. To implement the game feature, a base probability or range of probabilities governs, in at least some aspects of the present concepts, whether the game feature will, in fact, yield or cause the realization of a first positive feature and/or second positive feature. For example, the game feature may only yield a positive feature of, on average, ten percent of games in which the game feature is enabled. In another example, the game feature may yield a positive feature of, on average, ninety percent of games in which the game feature is enabled. The probability of a positive feature and/or the value or potential range(s) of value of the positive features are premised, in at least some embodiments, on the expected values of both the base game and any bonus game so as to at least generally maintain a desired overall expected value on to stay within a predetermined range of expected values. Accordingly, in such embodiments, for a given fixed extra wager, a statistical increase to the probability of realization of the positive feature would be correlated to a statistical decrease in the value or potential range(s) of value of the positive features or a statistical decrease in the probability of realization of the positive feature would be correlated to a statistical increase in the value or potential range(s) of value of the positive features. In still other aspects, the above-noted opportunity for a positive feature is only available to a player realizing a losing outcome (i.e., not to a player achieving a winning outcome), such positive feature occurring in a subsequent game.

Still further, the positive feature may be selectively weighted, by the controller 34 or possibly even by the player, to statistically favor one positive feature over another. For example, a player may favor the clue feature for a losing outcome in the wagering game over other positive feature and may select the clue feature from a selection screen or pop-up window as being a preferred positive feature and/or may be permitted within predefined ranges to adjust upwardly or downwardly the statistical ranking or other characteristics of the positive outcomes.

As noted above, the game feature is enabled, in some aspects, by placing a max line bet which activates every pay line and provides the potential for numerous separate winning outcomes for different winning combinations. The game feature may comprise a single opportunity for a positive feature regardless of how many separate winning outcomes are achieved in the wagering game or, in alternative configurations, provide a plurality of opportunities for a positive feature corresponding in number to a number of winning outcomes or corresponding in number to a number of winning outcomes meeting or exceeding a predetermined threshold criteria (i.e., only certain winning combinations would qualify). For a losing outcome in the wagering game, wherein no winning combination occurs across any of the active paylines, the game feature provides a single opportunity for a positive feature. As noted above, in some aspects of the present concepts the positive feature may be advantageously implemented upon each losing outcome in the wagering game.

In one aspect of the present concepts, the game feature provides, for a player's input of a one credit extra wager above and beyond a max line bet, a single opportunity for a positive feature regardless of how many separate winning outcomes are achieved in the wagering game and a single opportunity for a positive feature arising from a losing outcome in the wagering game. The player may optionally be permitted to incrementally input still further wagers to increase the number of opportunities available to the player for a positive feature for winning outcomes and/or losing outcomes in the wagering game. For example, a player placing a max line bet wager may then place a three-credit extra wager to obtain three opportunities for a positive feature in the game feature enabled by the input of the three-credit extra wager. These three opportunities are attached, in some aspects, only to winning outcomes in the wagering game. Further, the opportunities provided by this example of the game feature may optionally be realized only in correspondence to an equal number of winning outcomes, so that a single winning outcome would provide a single opportunity for a positive feature, two winning outcomes would provide two opportunities for a positive feature, three winning outcomes would provide a full three opportunities for a positive feature in accord with the three-credit extra wager, and four or more winning outcomes would yield no additional opportunities (beyond the three covered by the three-credit extra wager) for a positive feature.

Further to an embodiment wherein the game feature provides one or more opportunities for a positive feature for a single, predetermined extra wager, other embodiments of the game feature comprise a parsed or incremental game feature wherein the game feature is divided into different constituent components to permit the player to selectively allocated in whole or in part the extra wager to one or more of the desired components of the game feature. For example, an extra wager of five credits may be allocated with one credit being applied to guarantee an opportunity for a positive feature in the game feature responsive to a winning outcome in the wagering game and four credits being applied to or to provide additional opportunities (e.g., four total opportunities) for a positive feature should a losing outcome occur in the wagering game, as a hedge against a losing outcome in the wagering game. To illustrate, a base opportunity for a positive feature obtainable via a wager of a single extra credit further to a maximum base wager may yield, on average, a game-feature positive feature 5% of the time, but the player may be permitted to increase that base opportunity for a positive feature through larger extra wagers, with each additional credit increasing the opportunity or probability of the positive feature in the game feature. For example, each additional credit could increase the probability of the positive feature occurring in the game feature by an additional predetermined amount such as, but not limited to, 1%, 2%, 3%, 4%, 5%, etc. In the above example, the allocation of four credits could provide four separate opportunities for a positive feature at 5% each or a single opportunity for a positive feature at 8% (e.g., 5%+3%), 11% (e.g., 5%+6%), or the like.

In another example, continuing with the above example, an extra wager of five credits may alternatively be allocated with one credit being applied to guarantee an opportunity for a positive feature in the game feature responsive to a winning outcome in the wagering game and four credits being applied to a potential losing outcome to increase a potential award that may be realized if a losing outcome occurs in combination with a positive feature in the game feature. Thus, if a base value range of award for a losing outcome in the wagering game were $X-C1 \leq X \leq X+C2$, where $X-C1$ is a $-3\sigma$ value and $X+C2$ is a $+3\sigma$ value and C1 and C2 are constants that may be equal, or may be different, the added three-credits may move the statistical probability of an award from X to a point between X and $X+C2$. For example, if an average award of a positive feature is 100 credits with a $-3\sigma$ value of 20 credits and a $+3\sigma$ value of 1000 credits, an increase in the extra wager may cause the controller to randomly select from a set of positive features offering a statistically greater probability of yielding an outcome between 100 credits and 1000 credits than of yielding an outcome between 100 credits and 20 credits. The set of positive features may, in fact, be displayed to a player and selectable by a player to further the engagement of the player with the game feature.

Thus, in at least some aspects, the game feature may facilitate interaction between the player and the game feature to allow the player to use higher and higher extra wagers above a minimum predetermined base wager to "turn up the heat" or to take the game feature and "kick it up a notch" to further enhance the base probability and/or award amounts, singly or in combination.

FIG. 5 shows a simulated screen in accord with an embodiment illustrating some aspects of the present concepts, wherein a primary display area 14 is shown having a plurality of symbols populating an array of symbol positions. The symbols indicate a randomly selected outcome of a wagering game. As noted above, the use of a transmissive display 56 is entirely optional and the present concepts are well suited to use in combination with the gaming machines 10, 110 shown in FIGS. 1a-1b. In the embodiment shown in FIG. 5, a transmissive display 56 is depicted as being disposed over a primary display 14 and overlays the primary display area 14, which, as shown, includes a plurality of mechanical (or video) reels 54a-e, thereby permitting video images to be displayed over selected portions of the primary display area. In this optional configuration, the player would see the primary display area 14, as modified by the images on the transmissive display 56. For example, as shown in FIGS. 5-6, one type of alteration could include, for example, the display of a video image, such as a character 100 (described below), over any desired portion of the primary display area 14 including over any one or more of the displayed symbols in the symbol array. The character 100 may advantageously be themed to the wagering game, gaming establishment, gaming machine manufacturer, or may even comprise a player-selected option from amongst a plurality of selectable characters. As shown, the character 100 represents a "Reel Hot Wins" game feature by a personified flame. Character 100, shown in FIGS. 5-6, provides a readily ascertainable indication of an enabled game feature, but such visual element is entirely optional and may be omitted.

FIG. 5 shows the wagering game at a point where, following a losing outcome (no winning combination across any of the active pay lines), the enabled game feature that is visually indicated by the character 100 is activated and controller 34 determines whether or not the opportunity for a positive feature in the game feature is realized to yield a positive feature and, if so, to determine the positive feature from a set of available outcomes. As is illustrated by the pop-up window 150 displayed on the transmissive display 56 in the example of FIG. 5, the controller 34 has determined that a positive feature is to be realized in the game feature and that the positive feature is a credit award of 250 credits. Of course, the pop up window 150 could be displayed on the primary display (e.g., 14) or secondary display (e.g., 16), if desired, or on both the primary display and the transmissive display 58, such as in an overlapping or partially overlapping manner with varying transmissiveness or transparency to alter an appearance thereof. Further, the information may be communicated in a medium other than a pop up window and could include any medium or device used to communicate information to a player. For example, the information could be included in a scrolling marquee over the reels or adjacent the reels, a side bar, by a speaker (alone or in combination with displayed information), a mechanical/electro-mechanical device (e.g., a separate wheel or reel), etcetera.

FIG. 6 likewise shows the wagering game at a point where, following a losing outcome, the enabled game feature visually indicated by the character 100 is activated and controller 34 determines whether or not the opportunity for a positive feature in the game feature is realized to yield a positive feature and, if so, to determine the positive feature from a set of available outcomes. FIG. 6 shows an example wherein the controller 34 has determined that a positive feature is to be realized in the game feature and that the positive feature is a hint to the player that reveals a bonus feature that will occur on the very next spin. The controller 34 correspondingly causes, in this example, the transmissive display 56 to display a pop-up window 150 informing the player that "On the next spin, all [SYMBOL] will become wild!," wherein the illustrated [SYMBOL] is the symbol occupying the symbol positions at the bottom of reels 54a and 54d. This clue will encourage the player to not only play another spin, but also to maximize his or her bet per lines for that spin to take full advantage of the hint. Other examples of hints include, but are not limited to, "On the next spin, trigger the bonus with only two [SYMBOL]!," "[SYMBOL] on the next spin will be WILD!," "The next spin will contain the WILD Reels feature!," or "All [SYMBOL] will pay scatter on the next spin!," with each [SYMBOL] representing either a randomly selected symbol or a designated symbol and being displayed to the player on the primary display (e.g., 14). As previously noted, the clue award of the game feature does not guarantee a win in the subsequent play of the wagering game. Instead, it merely informs the player of some aspect of game play that is to occur in the next spin. If the player loses in the next spin after having enabled the game feature for that play of the wagering game (e.g., by placing a maximum wager and an extra wager further thereto), the player again has an opportunity or opportunities to trigger the game feature, shown as a "Reel Hot Wins" game feature in FIGS. 5-6.

In other types of wagering games, the hint may manifest in different forms to uniquely suit the particular wagering game being played. For example, the game feature may be implemented in conjunction with a video poker game and the hint may comprise a heads up to the player that either the player or the dealer will be dealt a specific hand, a specific card, or an initial hand meeting a certain threshold. For example, a player playing a stud poker or community poker game may be informed, following the player's loss, by the character 100 associated with an enabled game feature that one of the face down cards is going to be an Ace. In another example, the player might be informed that the dealer is going to hold at least one Ace in a subsequent hand. Alternatively still, the hint could be more generalized or vague such as, "I don't think you should bet big in the next round" or the like. Although the hints can certainly emphasize the positive, it may be advantageous to, at least on occasion, provide hints to the player in the nature of a warning to the player of a likely bad outcome for the player to help instill the player's trust in the game feature.

The hint may also be varied spatially and/or temporally. Thus, the hint need not be limited to a subsequent play of the wagering game or even the same gaming machine. In various examples, the hint may be future-centric, such as "Ten games from now you are going to get REALLY lucky" or "Hang with me and enjoy [ADVANTAGE] starting 50 games from now" or "I'm saving something special for you later—be sure to be here at [TIME]." The hint may also or alternatively relate to events external to the gaming machine on which the player is playing. For example, a game feature character 100 may inform the player that a certain adjacent or nearby gaming machine (or other defined gaming machine, such as "The gaming machine under the big 'W' in the gaming area") is presently "hot," about to be "hot," or will be "hot" at some designated point in time or for some designated period in the future.

As noted above, one embodiment of the game feature may advantageously utilize the aforementioned transmissive display 56 to display not only any optional representation of an enablement of the game feature (e.g., character 100), but to also display a determination of whether or not a positive feature is to be realized and/or a determination of the award to be awarded. For example, a spinning wheel comprises a plurality of sections labeled with the available awards corresponding to the awards potentially available in the game feature for a corresponding winning or losing outcome in the wagering game. For example, for a losing outcome such as is indicated in FIGS. 5-6, the wheel might depict labels such as, but not limited to, "Bonus Trigger on 2 [SYMBOL]," "Extra credits," "[SYMBOL] is wild," "[SYMBOL] is a scatter pay," "CLUE," "WILD Reels," or "AWARD ALL!," with "Sorry!" or "No award this time" labeled sections interspersed between the labeled award sections. The wheel would rotate and come to a stop with a specific labeled section being disposed proximate an indicator to indicate which award, if any, is being realized through the game feature. These graphics, or any other type of graphical representation of the controller's 34 determination or decision process, can thus serve to further heighten the player's anticipation and enjoyment of the wagering game.

The transmissive display 56 can also be used to depict the selection of an award within a category. For example, if it is determined that a positive feature for the game feature has been realized and is an award, any manner of display (rotating reel or reels, rotating reel, etc.) may be used to depict the selection by the controller 34 of a particular award from amongst a plurality of available awards. In the "Reel Hot Wins" example, the character 100 could ignite the fuse on one of a plurality of bundles of fireworks, which would then explode in a brilliant display to reveal an underlying credit award. The form of and/or timing of any such displays on the transmissive display 56 may be freely varied by the gaming machine designer or gaming establishment to achieve a desired effect, such as to accelerate play, heighten excitement, or provide varied entertainment. As shown in FIGS. 5-6, the determining of whether or not the opportunity provided by the game feature is, in fact, realized and the determining of the award need not be shown and may simply be communicated instantly to the player.

In one embodiment utilizing the transmissive display 56, one positive feature that may potentially occur in response to an enabled game feature and either a winning outcome or a losing outcome in the wagering game is a "WILD reels" outcome. In the "WILD reels" outcome, a reel comprising one or more WILD symbols and BLANK symbols is displayed on the transmissive display 56 to spin on top of a "stopped" reel (e.g., 54a, 54b, 54c, 54d, or 54e) or, alternatively, a plurality of reels comprising one or more WILD symbols and BLANK symbols spins on top of a corresponding plurality of "stopped" reels (e.g., any combination of 54a, 54b, 54c, 54d, or 54e). The transmissive display reel(s) each comprise, in one aspect, a plurality of symbol positions corresponding to the symbols positions of the underlying primary display 14 reels. When the transmissive display reel(s) stop, each symbol position of the transmissive display reel(s) is superimposed over the underlying primary display reel symbol positions. The controller 34 determines the symbol position for each of the transmissive display reel(s) WILD symbols and forms a new array from the original array represented by the primary display 14 reels 54a-54e, with each of the underlying primary display reels symbol positions corresponding to the symbol positions of the transmissive display reel(s) WILD symbols being replaced by a WILD symbol. The controller 34 then reevaluates this newly formed array for winning outcomes.

In still other configurations, the "WILD reels" outcome may produce one or more "reels" that consist of a "1×1" reel array disposed over a single symbol position of an underlying one of reels 54a-54e. During the game feature, each "1×1" reel array changes state as would an ordinary reel until the outcome for that symbol position is revealed.

In accord with the above-described aspects, it can be appreciated that one example of a method of conducting a wagering game on a gaming system could include the acts of displaying on a game display an array of symbols indicating a randomly selected outcome of the wagering game in response to receiving a wager from a player, accepting a first wager to play a wagering game, accepting a second wager, further to the first wager, to enable a game feature relating to the wagering game, and enabling the game feature responsive to an input of the second wager. In this method, the game feature provides an opportunity for the player to receive, further to a winning outcome in the wagering game, a randomly selected first positive feature in the game feature and/or an opportunity for the player to receive, further to a losing outcome in the wagering game, a randomly selected second positive feature in the game feature. As noted above, in some aspects of the present concepts, the first wager must be a max line bet wager, whereas in other aspects of the present concepts, the first wager may comprise a lesser base wager, possibly with decreased odds of realizing a positive feature and/or lower potential awards even should the positive feature be realized. The player, as indicated previously, may optionally be permitted to allocate the extra wager or portions of the extra wager selectively to an opportunity to receive a positive feature responsive to a winning outcome in the wagering game, a positive feature responsive to a losing outcome in the wagering game, or both.

Another method of conducting a wagering game on a gaming system in accord with aspects of the present concepts includes the acts of accepting a first wager to play a wagering game, the first wager activating a plurality of pay lines, accepting a second wager, further to the first wager, to enable a game feature relating to the wagering game, and enabling the game feature responsive to an input of the second wager, determining, in association with the wagering game, a randomly selected outcome, displaying the randomly selected outcome of the wagering game as a plurality of symbols populating an array of symbol positions, and evaluating each combination of symbols disposed along an active pay line to determine if the combination of symbols along that pay line in the symbol array comprises a winning combination. This method also includes the act of randomly determining one or more outcomes for the game feature to determine if the enabled game feature yields one or more positive features, the positive feature comprising a symbol modifier, an array modifier, an award arrangement modifier, a direct award, and/or a clue relating to a subsequent wagering game, when the symbol array comprises no winning combination and the positive feature comprising a symbol modifier, an array modifier, an award arrangement modifier, a direct award, and/or an award modifier when the symbol array comprises at least one winning combination. The method further includes the acts of awarding an award in accord with a pay table for any winning combination in the wagering game absent any positive feature in the game feature and/or any winning combination in the wagering game occurring responsive to the one or more positive features the game feature and awarding an award for any direct award indicated by the positive feature.

In still another aspect of the present concepts, the present concepts comprise a computer readable media bearing instructions which, when executed by one or more processors, causes the one or more processors to perform operations in association with a game feature conducted on a wagering game, the operations comprising displaying on a game display an array of symbols indicating a randomly selected outcome of the wagering game in response to receiving a wager from a player, accepting a first wager to play a wagering game, accepting a second wager, further to the first wager, to enable a game feature relating to the wagering game, and enabling the game feature responsive to an input of the second wager. In accord with these instructions, the game feature provides an opportunity for the player to receive, further to a winning outcome in the wagering game or a losing outcome in the wagering game, a positive feature separate and apart from any winning outcome in the wagering game.

Figure 7:
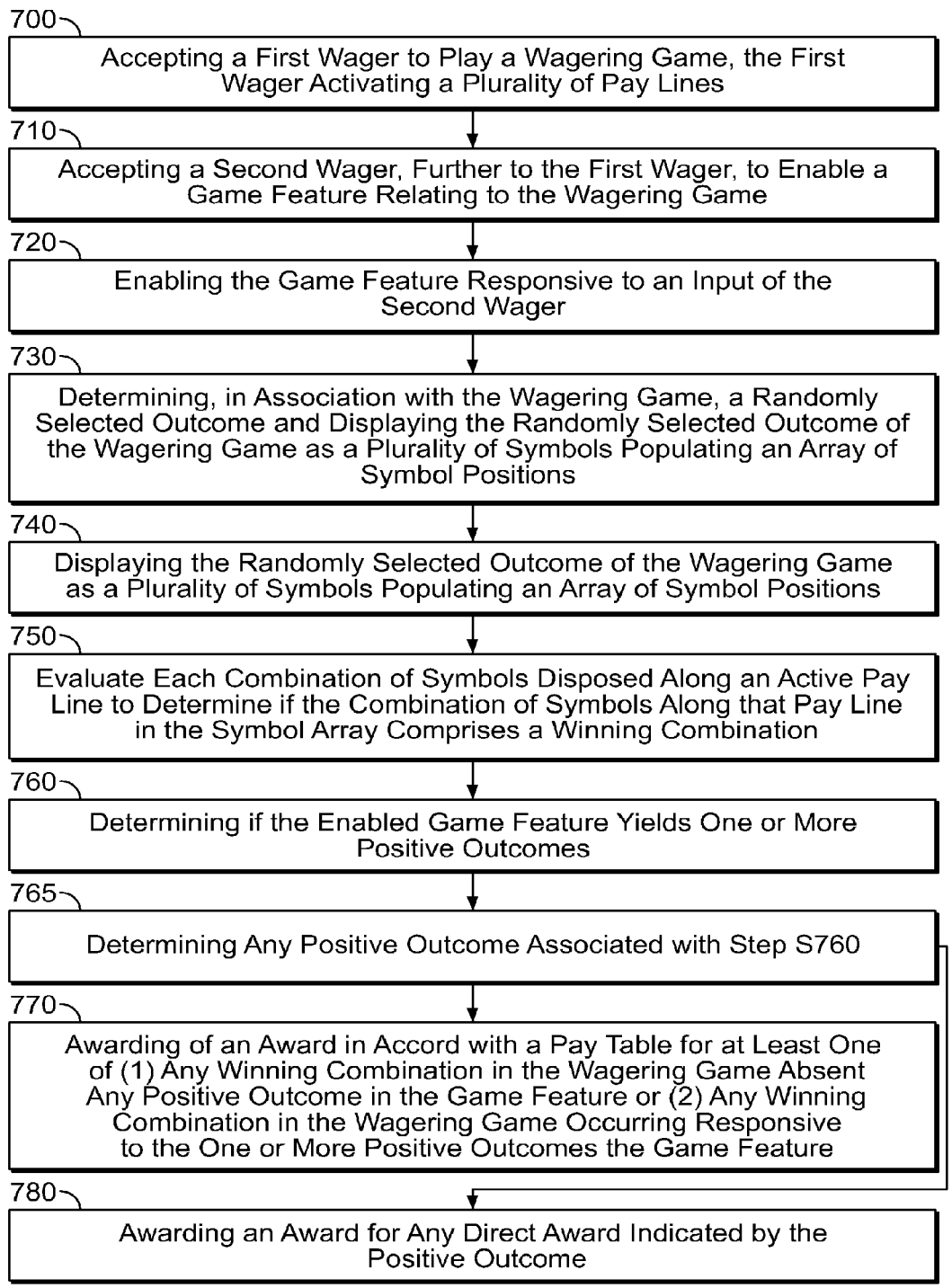
FIG. 7 is a flowchart for an algorithm that corresponds to instructions executed by a controller in accord with at least some aspects of the disclosed concepts.

FIG. 7 shows one example of various operations performed by rule sets in accord with one aspect of the present concepts in which a computer readable media bearing instructions is accessed by one or more processors, which execute the instructions and causes the performance of operations in association with game feature described in any of the various aspects described herein. FIG. 7 shows an example wherein such operations include accepting a first wager to play a wagering game, the first wager activating a plurality of pay lines (step S700), accepting a second wager, further to the first wager, to enable a game feature relating to the wagering game (step S710), and enabling the game feature responsive to an input of the second wager (step S720). The instructions further cause the processors to perform, in a step S730, determining, in association with the wagering game, a randomly selected outcome and displaying the randomly selected outcome of the wagering game as a plurality of symbols populating an array of symbol positions (step S740). The instructions further require processors to evaluate each combination of symbols disposed along an active pay line to determine if the combination of symbols along that pay line in the symbol array comprises a winning combination (step S750), determining if the enabled game feature yields one or more positive features (step S760), and determining the positive features (step S765). The positive feature may comprise one or more of a symbol modifier, a bonus trigger modifier, an award arrangement modifier, a direct award, an award modifier, or a clue relating to a subsequent wagering game, when the symbol array comprises no winning combination. The positive feature may comprise one or more of a symbol modifier, a bonus trigger modifier, an award arrangement modifier, a direct award, or an award modifier when the symbol array comprises at least one winning combination. The determination of the positive feature (step S765) may be randomly performed by the processor(s), may be selected in accord with a schedule or look up table, or may be selected in accord with an unweighted or weighted algorithm. The instructions further provide for the awarding of an award in accord with a pay table for at least one of (1) any winning combination in the wagering game absent any positive feature in the game feature or (2) any winning combination in the wagering game occurring responsive to the one or more positive features the game feature (step S770) and awarding an award for any direct award indicated by the positive feature (step S780).

Returning again to the positive feature comprising a hint to a player, a variation on this theme may hold that, where (1) the player capitalizes on the suggestion or hint provided to the player and places a maximum wager (optionally dependent on the input of the extra wager to enable the game feature in the subsequent round) and (2) the outcome in the wagering game is a winning outcome relating to the suggestion or hint (e.g., the hint was that "On the next spin, trigger the bonus with only two [SYMBOL]" and indeed the bonus was triggered by two [SYMBOL]), the still additional opportunities and/or awards may be provided to the player. For example, one or more additional free bonus pay lines on the next spin(s) can be provided. The bonus pay lines can be on the base game, bonus game (including free spin bonus) or other modes of play which can result in a win. The pay lines can be player-selected or controller-selected in the form of custom (not part of any game pay lines) or game-defined pay lines. The pay lines can result in additional pay line credit(s) per line or pay line multiplier. The pay line bonus can be triggered by a variety of ways including pay line wins, scatter or mystery bonus methods. In other types of wagering games, such as video poker, the additional opportunities and/or awards may comprise, for example, an additional draw, an increased award for a winning hand, a series of free plays, or even an additional hint for a subsequent wagering game even absent an input of the extra wager.

Another concept includes the increasing of a duration of the reel spin without increasing the average spin cycle. Maintaining the average spin cycle, in effect, maintains the gaming establishment's coin-in average for the gaming machine. The benefit of the increase in the duration of the reel spin permits the game developer to slow down the time it takes for each reel to spin and stop, allowing the player to see and register each reel's resulting symbol(s). The more time a player has to follow each reel's result, the greater the player's anticipation and excitement. A problem with some current slot machine games is that the reel outcomes pop or progress so quickly that a player may not have sufficient time to follow a building win and develop anticipation over the potentially culminating outcome. However, as noted, increasing a duration of the spin cycle correspondingly increases the average spin cycle, which adversely affects the coin-in average for the machine. Thus, the inventors devised a method and system for slowing the reel's spin time to permits players to follow and appreciate the progression of the outcome without reducing the coin-in and, in the process, balance the gaming establishment's desire to preserve coin-in (minimum reel spin duration) with player anticipation and enjoyment (increasing reel spin duration). The solution arrived at by the inventors is to use real-time pay lines or, stated differently, pay lines that visually build from left to right as each reel stops (or in the same direction or sequence or the reel stoppage for any variant of reel outcome presentation). As long as a winning combination is being formed or continues to be formed, thereby maintaining the potential to form a potential winning combination or a greater winning combination than that already revealed, the reels will continue to spin with an increased or greater than average duration. However, should a stopped reel reveal an outcome that breaks the chain and extinguishes the potential for an award along an active pay line, subsequent reels may be stopped immediately or at a shorter than average duration. Optionally, the first reel may also be stopped quickly, immediately or at a shorter than average duration since, at the initiation of the wagering game, there are no revealed symbols and there is not yet any appreciable degree of heightened anticipation over a building potential for a win.

To illustrate the above concept, an example wherein an average reel spin duration is 3 seconds and an average spin cycle for the wagering game is 15 seconds for a 5-reel game is now discussed. In this example, a single pay line is active, although the concept certainly applies to multiple pay lines. After initiation of the wagering game, all of the reels are set into motion at time zero. A first reel may be stopped quickly (between zero and 3 seconds), at a normal or average spin duration (at about 3 seconds), or at an increased or higher than average spin duration (greater than 3 seconds). Here, in this example, it is assumed that the first reel is stopped after it spins for one second, provided a savings of two seconds. The second reel continues spinning and an increased or higher than average spin duration, here 4 seconds. At this point, along the pay line, it is assumed that two identical symbols are shown, but do not yet constitute a winning outcome. If a third symbol of the same type is shown along the pay line in the third reel, the player will be a winner. The third reel may then be permitted to reel continue spinning and an increased or higher than average spin duration that may be the same as that of the preceding reel, or even greater in duration. Here, it will be assumed that the spin duration of the third reel is even longer than that of the second reel and is 5 seconds. The third reel then stops to reveal a third symbol of the same type as is shown along the pay line in the first and second reels, making the player a winner. At this point, the display of the outcomes for the first three reels has taken one second longer (10 seconds) than that of a conventional arrangement (9 seconds), and the player is quite excited. The fourth reel and fifth reel continue spinning. Given the stakes, the spin duration of the fourth reel may be even longer still than that of the third reel and is 5 seconds. The fourth reel then stops to reveal a chain breaking outcome (i.e., a symbol that extinguishes the possibility of any further increase in the award). At this instant, the display of the outcomes for the first four reels has taken three seconds longer (15 seconds) than that of a conventional arrangement (12 seconds) and the fifth reel may therefore be stopped from spinning instantly since there is no possible scenario in which an additional win may be obtained. Thus, the complete spin cycle for both the example game and the example average game are both 15 seconds. Because the player would not have seen a pay line growing across the fourth reel, the player would know there is no need to waste time spinning and waiting for the fifth reel to stop. The time saved by not waiting for the fifth reel to continue spinning was used to increase the spin duration of the preceding reels.

Likewise, in another example, for a standard left to right pay using the above average reel spin duration and average spin cycle for a 5-reel game having a single active pay line, a first reel is stopped quickly at two seconds. The second reel is permitted to continue spinning for four seconds before it is stopped. Should the second reel already indicate that no winning outcome is possible, the play of the wagering game may then be accelerated with each of the subsequent reels stopping simultaneously and immediately or may stop in succession at a decreased spin duration (e.g., one second each) to respectively yield a spin cycle for these examples of 6 seconds and 9 seconds, as compared to the average of 15 seconds. This time surplus may then be stored and allocated in later games that would benefit from the increased reel spin durations.

In one configuration, the stopping of the final reel(s) is automated and controlled by the controller 34. In another configuration, the player is given the option through a player input device to stop the spin early when they don't see a pay line building.

Further to the above concepts, in some aspects of the present concepts, a bank of gaming machines 10 is provided and, at any given time, one of the gaming machines is designated as being a "hot" gaming machine that pays out extra credits or has better odds, as compared to the other gaming machines, or presents an optional portal/side bet to the player, such optional portal/side bet not being available to gaming machines that are not "hot." The identity of the "hot" machine, as noted above, might be the suggestion or hint to the player provided responsive to a losing outcome in the wagering game wherein the player placed a max line bet wager to enable the game feature. The "hot" gaming machine advantageously is randomly selected from available gaming machines in the bank so that the "hot" gaming machine unpredictably bounces from gaming machine to gaming machine in the bank. Alternatively, the "hot" machine may be specifically provided with a visual designation that the gaming machine is "hot." For example, a top box of each gaming machine may include a simulated flame that smolders when the machine is not hot but erupts into a simulated crackling bonfire when the gaming machine is "hot." The duration of the "hot" designation may be directly influenced by the players wagering during the "hot" period. Max betting or, more particularly the high rates of coin-in, may increase the duration of the "hot" designation, but will not do so indefinitely. For example, a "hot" meter may start at a top value of 100% seconds and will decrease in real time (e.g., 0.5% every second, 1% every second, etc.), with each Max Line Bet and play (adding an additional increment such as, but not limited to 0.5%, 1%, 2%, etc. to the meter). Optionally, concurrent with the enablement of the gaming machine as a "hot" machine, one or more of the reel symbols for the wagering game may alter to reflect the "hot" nature of the gaming machine and certain trigger symbols or winning combinations of symbols, such as along an active pay line, can also be used to increase the duration of the "hot" designation. For example, a flaming character 100 symbol could be added to the reel and three flaming character symbols along a pay line could yield an award and an extra 10% or 25% (or other higher or lower percentage) to the "hot" meter, possibly even replenishing the meter entirely. For an average game duration of at least several seconds (assuming a player is enabled to stop all of the reels manually), a player may hope to stretch out the "hot" streak for several minutes.

In another example, a bunch of lilies may be provided on the video top boxes with an animatronic frog (or other animal or creature), puppet frog, or more desirably a video projection of a frog onto a display surface or screen element from a projector to simulate the hopping of the frog from machine to machine. The machine with the frog is the "hot" machine and, as noted above, players may optionally be permitted to influence the duration of the frog's presence at their machine. Obviously, any nature of character or characteristic may be employed in combination with the top box, or other portion of the gaming machines in the bank (or even across multiple different banks of machines), such as through a secondary display 116, to comport with a given game theme, gaming establishment theme, gaming machine manufacturer's theme, or advertiser's theme. As noted, one or more projectors (e.g., CRT projector, LCD projector, DLP projector, LCOS projector, etc.) may be provided to provide the aforementioned video images and are preferably adapted to pan, tilt, and auto focus a projected image onto any one of a plurality of pre-designated coordinates (e.g., the gaming machine top boxes of each gaming machine or a subset of gaming machines in a bank of gaming machines). In accord with this and the preceding example, the gaming machines are not stand-alone products isolated from one another, but are functionally integrated in a scalable manner to permit small numbers or large numbers of gaming machines to be related to one another by a common game play element.

Any type of displayed content may be displayed on the transmissive display 56 while any other type of displayed content is be displayed on the underlying primary display 14 (or secondary display should a transmissive display be provided over a secondary display), without limitation. For example, the displayed content for either the transmissive display 56 or the primary display 14 or other display (e.g., secondary display 16, handheld displays 114, 116, etc.) may include, but is not limited to, base wagering game content, bonus game content, help screen content, attract display content, navigation-based content, advertising content, or informational content (e.g., news, messages, instructions, etc.). Thus, a bonus game, advertising, or other content, may be displayed concurrently on the transmissive display 56 while a base wagering game is being played on the mechanical (or video) reels 54*a-e*. Alternatively, in some embodiments, certain content, such as a bonus game, may be displayed on the transmissive display 56 only at and during designated times (e.g., when a bonus round begins), after which time the bonus game content is removed from the transmissive display 56 and play of the base wagering game resumes on the primary display area 14.

FIG. 7, described by way of example above, represents one algorithm that corresponds to instructions executed by the controller 34 and/or external systems 50 in FIG. 2 to perform the above described functions associated with the disclosed concepts.

In accord with some aspects of the disclosed game feature, the act of providing to the player a clue relating to a subsequent wagering game may passively provide information on a predetermined random outcome in a subsequent play of the wagering without altering any aspect of the subsequent game. Alternatively, in accord with other aspects of the disclosed game feature, the act of providing to the player a clue relating to a subsequent wagering game may itself actively alter the random outcome, or otherwise influence the generation of a random outcome, for a subsequent play or plays of the wagering game to cause the realization of the disclosed clue.

Each of these embodiments and obvious variations thereof is contemplated as falling within the spirit and scope of the claimed invention, which is set forth in the following claims. For example, although in the game display of FIGS. 5-6 show one form of an array of symbols indicating a randomly selected outcome of the wagering game, the array may comprise any uniform or non-uniform, symmetric or asymmetric representation of distribution of such symbols. Additionally, although the optional transmissive display 56 has been described to overlay the primary display area 14, the transmissive display may overlay only a portion of the primary display (e.g., a single symbol position or a subset of symbol positions), thereby permitting video images to be displayed over such portion of the primary display. As another embodiment included within the present concepts, the game feature may be enabled by a specially allocated extra wager placed in combination with a base wager that is less than a maximum base wager. Accordingly, players may take advantage of an opportunity afforded by the game feature, but with lesser base wager amounts (e.g., less than the maximum permissible base wager). The game feature may thus be scaled up or down (e.g., probability of positive feature and/or average amount of award per positive feature) to correspond to the wagers and extra wagers placed by the player.

What is claimed is:

1. A gaming system for conducting a wagering game, the gaming system comprising:
  a game display configured to display an array of symbols indicating a randomly selected outcome of the wagering game in response to receiving a wager from a player;
  an input device adapted to receive one or more inputs from the player and to output a signal corresponding to the one or more player inputs; and
  a controller configured to conduct the wagering game and a game feature associated with the wagering game, the controller further being configured to enable play of the wagering game responsive to an input of a first wager and to enable the game feature responsive to an input of a second wager further to the first wager,
  wherein the game feature provides an opportunity for the player to receive, responsive to a randomly determined losing outcome in the wagering game, a positive feature in a subsequent play of the wagering game, the subsequent play of the wagering game including a new randomly selected outcome, and the positive feature increasing the probability of a winning outcome in the new randomly selected outcome of the subsequent play of the wagering game.

2. A gaming system for conducting a wagering game according to claim 1, wherein the first wager consists of a max line bet wager.

3. A gaming system for conducting a wagering game according to claim 1, wherein the controller is further configured to cause the game display to display a visual element indicative of enablement of the game feature subsequent to input of the second wager.

4. A gaming system for conducting a wagering game according to claim 1, wherein the positive feature comprises a modifier to an award associated with a winning outcome, the modifier including an award of extra credits or a multiplier added to the winning outcome.

5. A gaming system for conducting a wagering game according to claim 1, wherein the positive feature comprises a modifier to a trigger for a bonus game, the modifier increasing the probability that the bonus game is triggered, and wherein the controller is further configured to evaluate the array of symbols against the modified trigger to determine if the array of symbols satisfies the modified trigger.

6. A gaming system for conducting a wagering game according to claim 1, wherein the positive feature comprises an enhancement to the symbol array and evaluation of the enhanced symbol array against a plurality of winning outcomes in a pay table or an evaluation of additional arrangements of symbols in the symbol array for additional symbol array winning outcomes.

7. A gaming system for conducting a wagering game according to claim 1, the gaming system further comprising:
  a transmissive display disposed over the game display, the transmissive display being configured to display one or more graphical elements over an underlying array of symbols displayed via the game display;
  wherein the positive feature comprises an enhancement to the symbol array which includes the display of the one or more graphical elements, via the transmissive display, over the underlying array of symbols in a subsequent wagering game; and
  wherein the one or more graphical elements are evaluated in combination with the underlying array of symbols in the subsequent wagering game.

8. A gaming system for conducting a wagering game according to claim 7,
  wherein the one or more graphical elements comprise a plurality of wild symbols and blank symbols in symbol positions overlying corresponding symbol positions of the game display symbol array,
  wherein an enhanced symbol array is formed comprising a first set of symbol positions selected from the transmissive display array, which first set of symbol positions includes all of the wild symbols displayed on the transmissive display, and a second complementary set of symbol positions selected from the game display symbol array, which second set of symbol positions includes symbols displayed in the game display symbol array that are not overlaid by a transmissive display wild symbol, and
  wherein the enhanced symbol array is evaluated against a plurality of winning outcomes in a pay table.

9. A gaming system for conducting a wagering game according to claim 1, wherein the positive feature comprises an award of extra credits in the subsequent play of the wagering game.

10. A gaming system for conducting a wagering game according to claim 1, wherein the positive feature comprises a modifier to a trigger for a bonus game, the modifier increasing the probability that the bonus game is triggered in the subsequent play of the wagering game, and wherein the controller is further configured to evaluate the array of symbols in the subsequent play of the wagering game against the modified trigger to determine if the array of symbols satisfies the modified trigger.

11. A gaming system for conducting a wagering game according to claim 1, wherein the positive feature comprises an enhancement that substitutes at least one type of symbol in the symbol array with an upgraded symbol, and evaluation of the enhanced symbol array with the upgraded symbols against a plurality of winning outcomes in a pay table or an evaluation of additional arrangements of symbols in the symbol array for additional symbol array winning outcomes.

12. A gaming system for conducting a wagering game according to claim 1, wherein the game feature further provides an opportunity for the player to receive an additional second positive feature, the additional positive feature comprising a clue given to the player to inform the player whether the positive feature, the additional positive feature, or both the positive feature and the additional positive feature, will be activated in a subsequent play of the wagering game.

13. A gaming system for conducting a wagering game according to claim 1, wherein the game feature also provides an opportunity for the player to receive, further to a winning outcome in the wagering game, another positive feature in the game feature further to any awards awarded in association with the displayed array of symbols indicating the randomly selected outcome of the wagering game.

14. A gaming system for conducting a wagering game according to claim 12, wherein the subsequent play of the wagering game for which the clue is revealed consists of an immediately subsequent play of the wagering game.

15. A gaming system for conducting a wagering game according to claim 1, wherein the second wager is a variable wager permitting a plurality of wagering points between a minimum second wager and a maximum second wager, and wherein the level of the variable wager influences one or both of the odds of realizing the positive feature and or improved outcomes for a realized positive feature.

16. A method of conducting a wagering game on a gaming system with at least one display device, at least one input device, and at least one controller, the method comprising:
  accepting, via the at least one input device, a first wager to play a first the wagering game;
  accepting, via the at least one input device, an extra wager, further to the first wager, to enable a game feature relating to the first wagering game;
  enabling, via the at least one controller, the game feature responsive to an input of the extra wager, the game feature providing an opportunity for the player to receive, responsive to a first randomly determined outcome in the play of the wagering game being a losing outcome, a randomly selected positive feature in a subsequent play of the wagering game;
  displaying, via the at least one display device, the first randomly determined outcome in the play of the wagering game, the first randomly determined outcome comprising a losing outcome;
  accepting, via the at least one input device, a second wager to play a the subsequent play of the wagering game;
  displaying, via the at least one display device, the a second randomly determined outcome of the subsequent play of the wagering game, the second randomly determined outcome of the subsequent play of the wagering game comprising the positive feature, the positive feature increasing the probability of a winning outcome in the subsequent play of the wagering game; and
  awarding any award associated with any winning outcome in the subsequent play of the wagering game.

17. The method of conducting a wagering game on a gaming system according to claim 16, wherein the first wager consists of a max line bet wager.

18. The method of conducting a wagering game on a gaming system according to claim 16, further comprising:
  displaying, responsive to both the enabled game feature and the losing outcome in the wagering game, a clue that the positive feature that will occur in the subsequent play of the wagering game.

19. The method of conducting a wagering game on a gaming system according to claim 18, wherein the positive feature comprises an award modifier or an award of extra credits and wherein the method further comprises:
  awarding, responsive to the enabled positive feature, one of an award of extra credits or an award multiplier.

20. The method of conducting a wagering game on a gaming system according to claim 18, wherein the positive feature comprises a bonus game trigger modifier, the method further comprising:
  altering a trigger for a bonus game in the subsequent play of the wagering game to increase the probability that the bonus game is triggered in the subsequent play of the wagering game.

21. The method of conducting a wagering game on a gaming system according to claim 18, further comprising:
  displaying the first randomly determined outcome of the first wagering game using a symbol array;
  displaying the second randomly determined outcome of the wagering game using a symbol array;
  enhancing the second symbol array in accord with the positive feature; and
  evaluating the enhanced second symbol array against a plurality of predetermined winning outcomes to determine if any combination of symbols along an active pay line corresponds to a winning outcome.

22. The method of conducting a wagering game on a gaming system according to claim 21, wherein the act of enhancing the second symbol array comprises changing at least one symbol in the second symbol array to a wild symbol.

23. The method of conducting a wagering game on a gaming system according to claim 21, wherein the act of enhancing the second symbol array comprises changing at least one symbol in the array to another symbol.

24. he method of conducting a wagering game according to claim 16, wherein the positive feature comprises a direct award.

25. The method of conducting a wagering game according to claim 16, wherein the positive feature comprises an award modifier.

26. The method of conducting a wagering game according to claim 16, further comprising the act of:
  awarding any award associated with the positive feature.

27. The method of conducting a wagering game according to claim 21, wherein the act of enhancing the second symbol array in accord with the positive feature comprises:
  displaying one or more graphical elements over the second array of symbols using a transmissive display; and
  evaluating the one or more graphical elements in combination with the second array of symbols.

28. A computer program product comprising one or more non-transitory computer readable media bearing instructions which, when executed by one or more processors, causes the one or more processors to perform operations in association with a game feature conducted on a wagering game machine, the operations comprising:
  accepting an indication of a first wager to play a first wagering game;
  accepting an indication of an extra wager, further to the first wager, to enable a game feature relating to the first wagering game;
  enabling the game feature responsive to the indication of the extra wager, the game feature providing an opportunity for the player to receive, responsive to a first randomly determined outcome in the play of the wagering game being a losing outcome, a randomly selected positive feature in a subsequent play of the wagering game;
  directing one or more display devices to display the first randomly determined outcome in the play of the wagering game, the first randomly determined outcome comprising a losing outcome;
  accepting an indication of a second wager to play the subsequent play of the wagering game;
  directing the one or more display devices to display a second randomly determined outcome of the subsequent play of the wagering game, the randomly determined outcome of the subsequent play of the wagering game comprising the positive feature, the positive feature increasing the probability of a winning outcome in the subsequent play of the wagering game;
  awarding any award associated with any winning outcome in the wagering game; and
  awarding any award associated with the positive feature.

* * * * *